United States Patent
Ge et al.

(10) Patent No.: US 9,482,905 B2
(45) Date of Patent: Nov. 1, 2016

(54) DISPLAY WITH COLUMN SPACER STRUCTURES

(71) Applicant: Apple Inc., Cupertino, CA (US)

(72) Inventors: Zhibing Ge, Sunnyvale, CA (US); Yeon Sik Ham, Cupertino, CA (US); Cheng Chen, San Jose, CA (US); Chia Hsuan Tai, Sunnyvale, CA (US); Enkhamgalan Dorjgotov, San Francisco, CA (US); Sang Un Choi, San Jose, CA (US); Shih-Chyuan Fan Jiang, Taipei (TW)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 14/307,841

(22) Filed: Jun. 18, 2014

(65) Prior Publication Data

US 2015/0370115 A1 Dec. 24, 2015

(51) Int. Cl.
  *G02F 1/1333* (2006.01)
  *G02F 1/1335* (2006.01)
  *G02F 1/1368* (2006.01)
  *G02F 1/1339* (2006.01)
  *G02F 1/1362* (2006.01)

(52) U.S. Cl.
  CPC ......... *G02F 1/13394* (2013.01); *G02F 1/1368* (2013.01); *G02F 1/133512* (2013.01); *G02F 1/133514* (2013.01); *G02F 2001/13396* (2013.01); *G02F 2001/13398* (2013.01); *G02F 2001/136222* (2013.01)

(58) Field of Classification Search
  CPC ................... G02F 1/133512; G02F 1/133514; G02F 1/13394; G02F 2001/13396; G02F 2001/136222; G02F 1/1368; G02F 2001/13398
  See application file for complete search history.

(56) References Cited

U.S. PATENT DOCUMENTS

| | | | |
|---|---|---|---|
| 5,680,187 A * | 10/1997 | Nagayama | G02F 1/13394 252/299.01 |
| 6,097,467 A * | 8/2000 | Fujimaki | G02F 1/13394 349/141 |
| 7,636,147 B2 | 12/2009 | Lee | |
| 7,812,918 B2 | 10/2010 | Choi et al. | |
| 8,027,016 B2 | 9/2011 | Choi et al. | |
| 8,451,417 B2 | 5/2013 | Won et al. | |
| 8,773,631 B2 | 7/2014 | Kim et al. | |
| 2009/0015780 A1* | 1/2009 | Choi | G02F 1/13394 349/156 |
| 2013/0003008 A1* | 1/2013 | Okumoto | G02F 1/133514 349/155 |
| 2013/0010238 A1* | 1/2013 | Chen | G02F 1/13394 349/106 |
| 2014/0118666 A1* | 5/2014 | Lee | G02F 1/13394 349/106 |
| 2015/0183955 A1* | 7/2015 | Deno | G02F 1/1339 349/110 |

FOREIGN PATENT DOCUMENTS

EP 0676661 A2 10/1995
JP H10197877 A 7/1998

* cited by examiner

*Primary Examiner* — Ryan Crockett
(74) *Attorney, Agent, or Firm* — Treyz Law Group, P.C.; G. Victor Treyz; Joseph F. Guihan

(57) ABSTRACT

A display may have a color filter layer and a thin-film transistor layer. A layer of liquid crystal material may be located between the color filter layer and the thin-film transistor layer. Column spacers may be formed on the color filter layer to maintain a desired gap between the color filter and thin-film transistor layers. Support pads may be used to support the column spacers. The column spacers and support pads may have comparable thicknesses. Different column spacers may be located at different portions of the support pads to allow the support pad size to be reduced while ensuring adequate support.

19 Claims, 19 Drawing Sheets

DISPLAY WITH COLUMN SPACER STRUCTURES

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Display pixels in a liquid crystal display contain thin-film transistors and electrodes for applying electric fields to the liquid crystal material. The strength of the electric field in a display pixel controls the polarization state of the liquid crystal material and thereby adjusts the brightness of the display pixel.

Substrate layers such as color filter layers and thin-film transistor layers are used in liquid crystal displays. The thin-film transistor layer contains an array of the thin-film transistors that are used in controlling electric fields in the liquid crystal layer. The color filter layer contains an array of color filter elements such as red, blue, and green elements. The color filter layer provides the display with the ability to display color images.

In an assembled display, the layer of liquid crystal material is sandwiched between the thin-film transistor layer and the color filter layer. Polyimide passivation layers cover the inner surface of the color filter layer and the upper surface of the thin-film transistor layer. An array of column spacers is formed on the inner surface of the color filter layer to maintain a desired gap between the color filter layer and the thin-film transistor layer. Column spacers are typically formed from hard organic materials such as photoresist.

During assembly operations, the layers of a liquid crystal display can be subjected to lateral forces. Even if great care is taken when handling the color filter layer and thin-film transistor layer, there is a possibility that these two layers will shift laterally with respect to each other. Lateral movement between the color filter layer and the thin-film transistor layer can cause damage to the display. For example, the column spacers can scratch the sensitive polyimide passivation layer material on the thin-film transistor layer, leading to undesirable visible artifacts on the display.

It would therefore be desirable to be able to provide electronic device displays with improved column spacer structures for minimizing scratches during lateral movement between display layers.

SUMMARY

A display may have a color filter layer with opposing outer and inner surfaces. The thin-film transistor layer may have an upper surface that faces the inner surface of the color filter layer. A layer of liquid crystal material may be located between the inner surface of the color filter layer and the upper surface of the thin-film transistor layer.

Column spacers may be formed on the color filter layer to maintain a desired separation between the color filter layer and the thin-film transistor layer. The columns spacers may include main column spacers that extend vertically across the entire liquid crystal layer and subspacer column spacers that extend vertically only partway across the liquid crystal layer.

Support pads may be formed on the surface of the thin-film transistor layer. The support pads may be used to support the column spacers. The support pads and column spacers may have comparable heights.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, 3, and 4.

Figure 1:
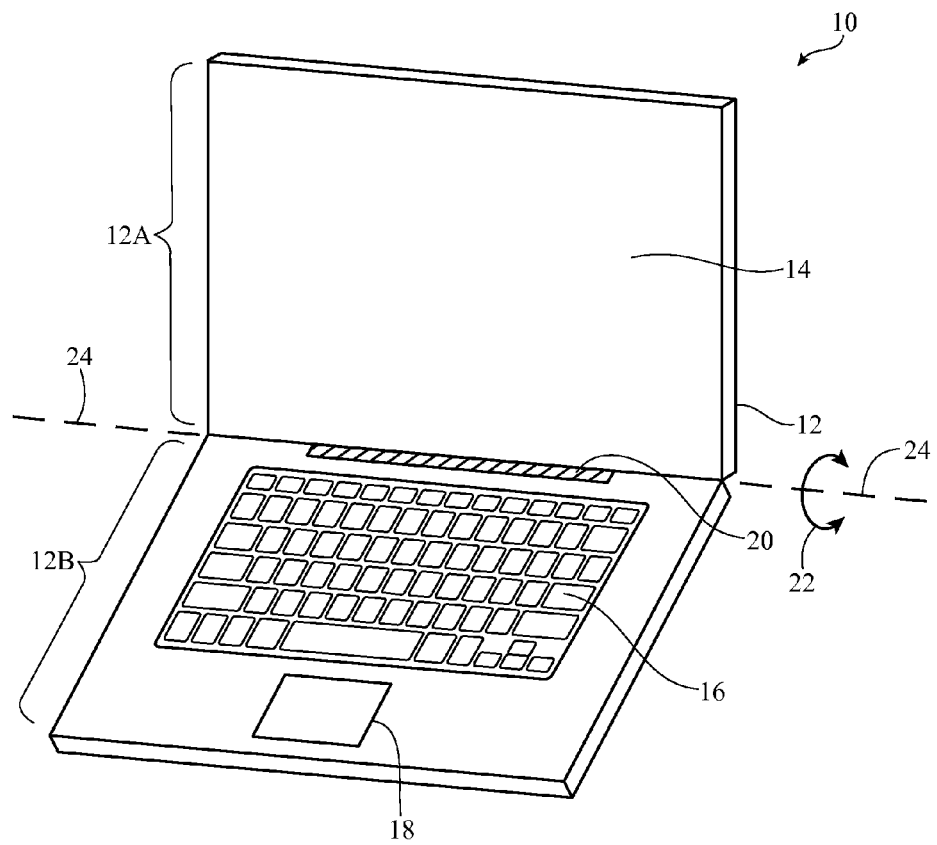
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
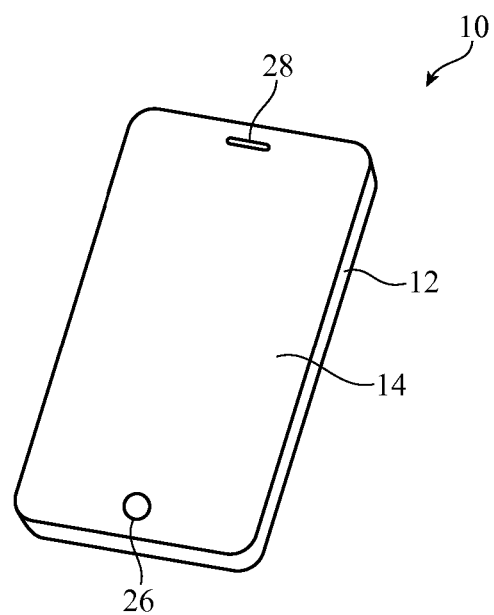
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
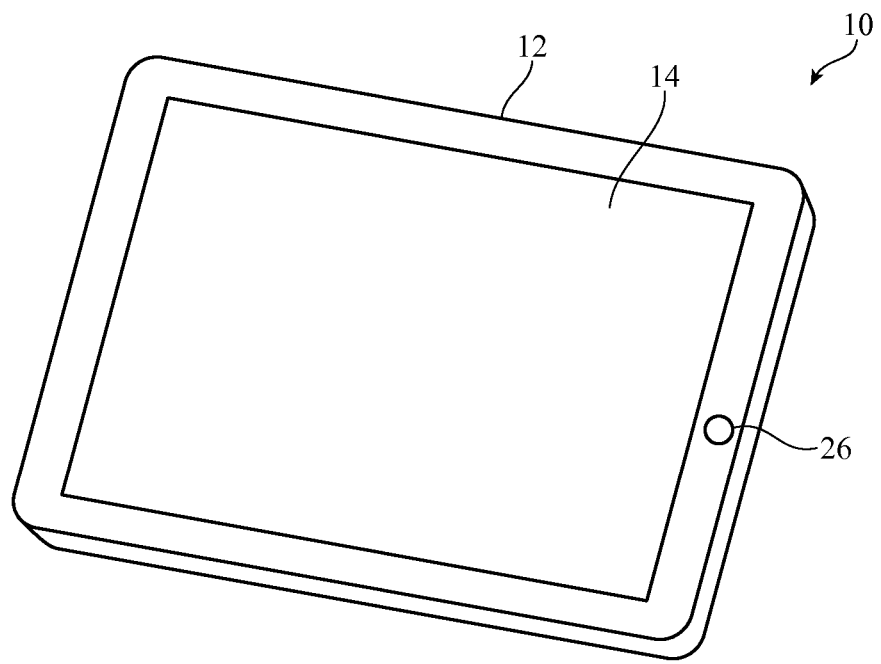
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
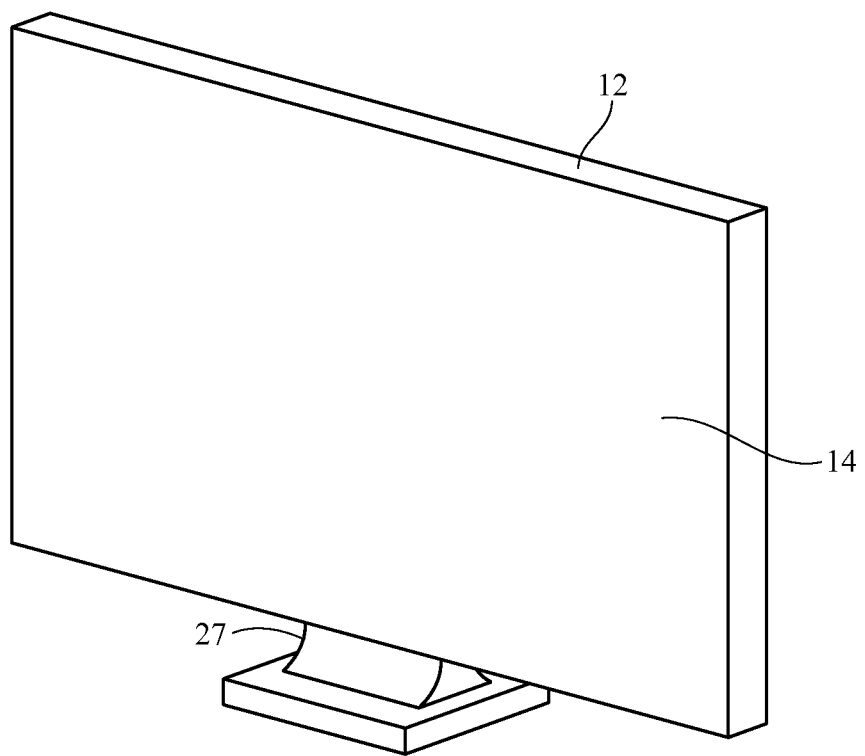
FIG. 4 is a perspective view of an illustrative electronic device such as a computer display with display structures in accordance with an embodiment.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
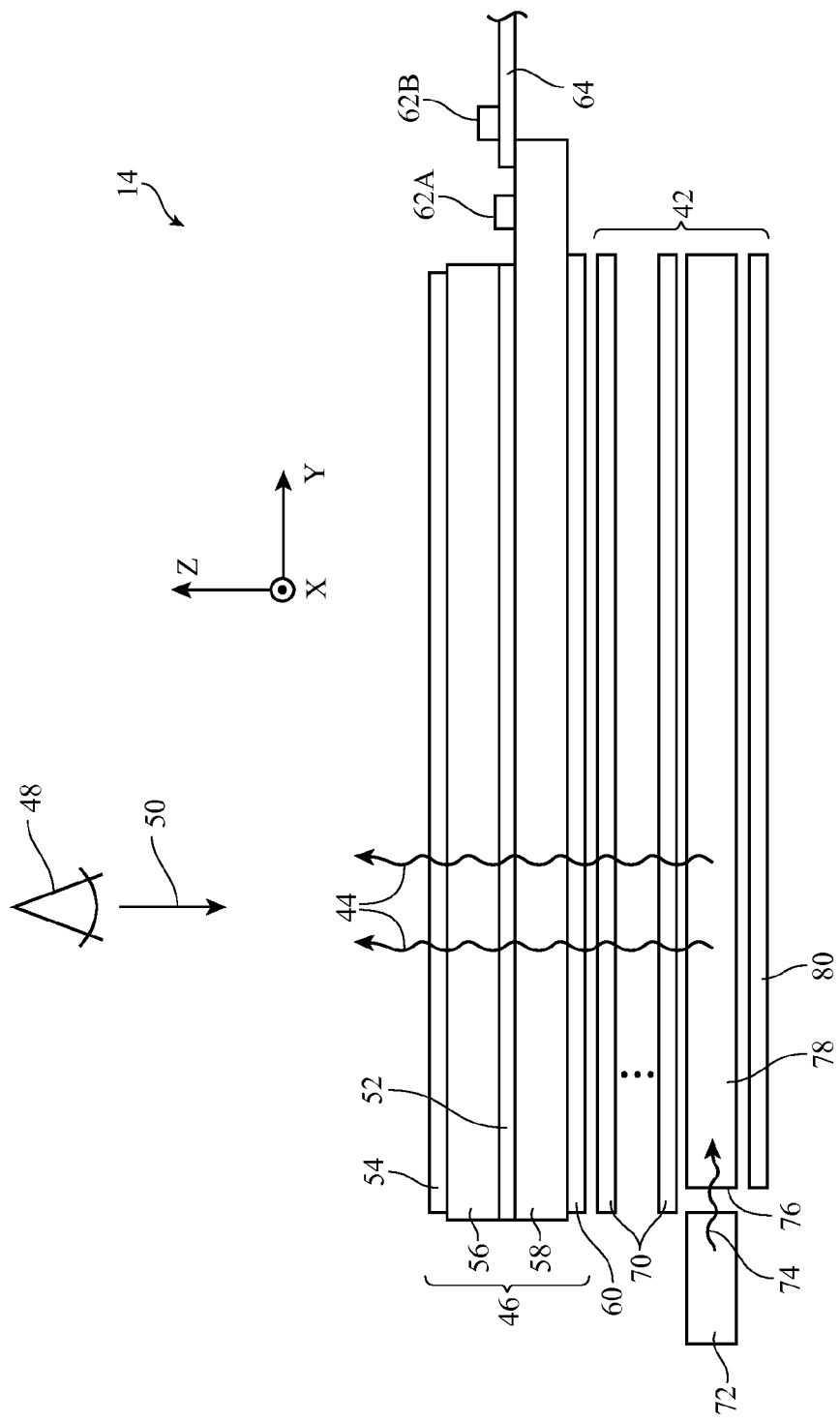
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52.

Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
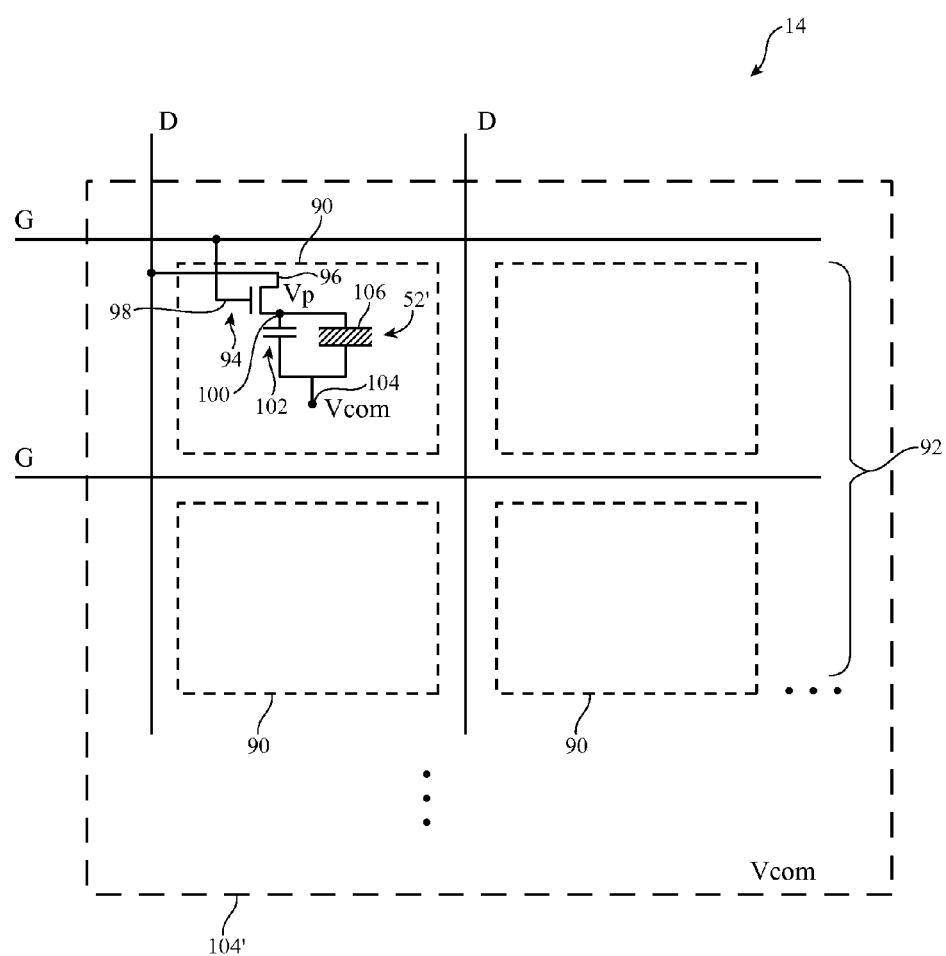
FIG. 6 is a top view of an array of display pixels in a display in accordance with an embodiment.

As shown in FIG. 6, display 14 may include a pixel array such as pixel array 92. Pixel array 92 may be controlled using control signals produced by display driver circuitry. Display driver circuitry may be implemented using one or more integrated circuits (ICs) and may sometimes be referred to as a driver IC, display driver integrated circuit, or display driver.

During operation of device 10, control circuitry in device 10 such as memory circuits, microprocessors, and other storage and processing circuitry may provide data to the display driver circuitry. The display driver circuitry may convert the data into signals for controlling the pixels of pixel array 92.

Pixel array 92 may contain rows and columns of display pixels 90. The circuitry of pixel array 92 may be controlled using signals such as data line signals on data lines D and gate line signals on gate lines G.

Pixels 90 in pixel array 92 may contain thin-film transistor circuitry (e.g., polysilicon transistor circuitry or amorphous silicon transistor circuitry) and associated structures for producing electric fields across liquid crystal layer 52 in display 14. Each display pixel may have a respective thin-film transistor such as thin-film transistor 94 to control the application of electric fields to a respective pixel-sized portion 52' of liquid crystal layer 52.

The thin-film transistor structures that are used in forming pixels 90 may be located on a thin-film transistor substrate such as a layer of glass. The thin-film transistor substrate and the structures of display pixels 90 that are formed on the surface of the thin-film transistor substrate collectively form thin-film transistor layer 58 (FIG. 5).

Gate driver circuitry may be used to generate gate signals on gate lines G. The gate driver circuitry may be formed from thin-film transistors on the thin-film transistor layer or may be implemented in separate integrated circuits. Gate driver circuitry may be located on both the left and right sides of pixel array 92 or on one side of pixel array 92 (as examples).

The data line signals on data lines D in pixel array 92 carry analog image data (e.g., voltages with magnitudes representing pixel brightness levels). During the process of displaying images on display 14, a display driver integrated circuit may receive digital data from control circuitry and may produce corresponding analog data signals. The analog data signals may be demultiplexed and provided to data lines D.

The data line signals on data lines D are distributed to the columns of display pixels 90 in pixel array 92. Gate line signals on gate lines G are provided to the rows of pixels 90 in pixel array 92 by associated gate driver circuitry.

The circuitry of display 14 such as demultiplexer circuitry, gate driver circuitry, and the circuitry of pixels 90 may be formed from conductive structures (e.g., metal lines and/or structures formed from transparent conductive materials such as indium tin oxide) and may include transistors such as transistor 94 that are fabricated on the thin-film transistor substrate layer of display 14. The thin-film transistors may be, for example, polysilicon thin-film transistors or amorphous silicon transistors.

As shown in FIG. 6, pixels such as pixel 90 may be located at the intersection of each gate line G and data line D in array 92. A data signal on each data line D may be supplied to terminal 96 from one of data lines D. Thin-film transistor 94 (e.g., a thin-film polysilicon transistor or an amorphous silicon transistor) may have a gate terminal such as gate 98 that receives gate line control signals on gate line signal path G. When a gate line control signal is asserted, transistor 94 will be turned on and the data signal at terminal 96 will be passed to node 100 as voltage Vp. Data for display 14 may be displayed in frames. Following assertion of the gate line signal in each row to pass data signals to the pixels of a that row, the gate line signal may be deasserted. In a subsequent display frame, the gate line signal for each row may again be asserted to turn on transistor 94 and capture new values of Vp.

Pixel 90 may have a signal storage element such as capacitor 102 or other charge storage element. Storage capacitor 102 may be used to store signal Vp in pixel 90 between frames (i.e., in the period of time between the assertion of successive gate signals).

Display 14 may have a common electrode coupled to node 104. The common electrode (which is sometimes referred to as the Vcom electrode) may be used to distribute a common electrode voltage such as common electrode voltage Vcom to nodes such as node 104 in each pixel 90 of array 92. As shown by illustrative electrode pattern 104' of FIG. 6, Vcom electrode 104 may be implemented using a blanket film of a transparent conductive material such as indium tin oxide (i.e., electrode 104 may be formed from a layer of indium tin oxide that covers all of pixels 90 in array 92).

In each pixel 90, capacitor 102 may be coupled between nodes 100 and 104. A parallel capacitance arises across nodes 100 and 104 due to electrode structures in pixel 90 that are used in controlling the electric field through the liquid crystal material of the pixel (liquid crystal material 52'). As shown in FIG. 6, electrode structures 106 may be coupled to node 100. The capacitance across liquid crystal material 52' is associated with the capacitance between electrode structures 106 and common electrode Vcom at node 104. During operation, electrode structures 106 may be used to apply a controlled electric field (i.e., a field having a magnitude proportional to Vp-Vcom) across pixel-sized liquid crystal material 52' in pixel 90. Due to the presence of storage capacitor 102 and the capacitance of material 52', the value of Vp (and therefore the associated electric field across liquid crystal material 52') may be maintained across nodes 106 and 104 for the duration of the frame.

The electric field that is produced across liquid crystal material 52' causes a change in the orientations of the liquid crystals in liquid crystal material 52'. This changes the polarization of light passing through liquid crystal material 52'. The change in polarization may, in conjunction with polarizers 60 and 54 of FIG. 5, be used in controlling the amount of light 44 that is transmitted through each pixel 90 in array 92 of display 14.

Figure 7:
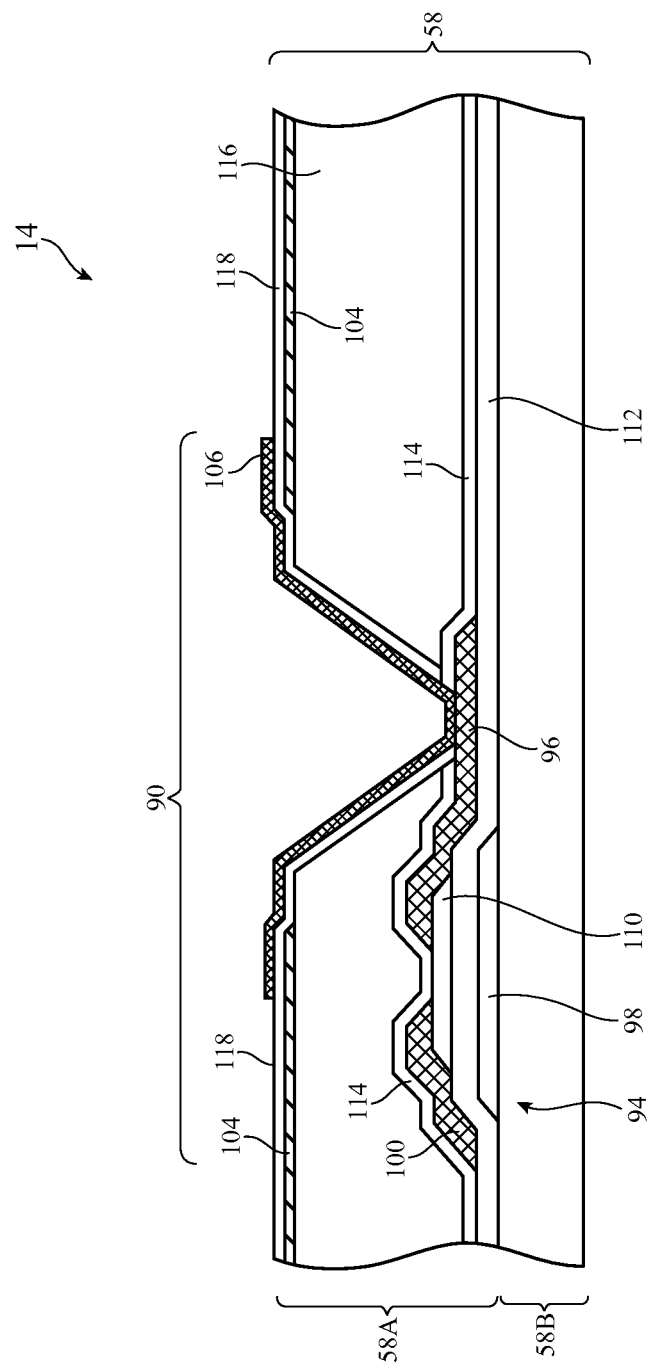
FIG. 7 is a cross-sectional side view of a portion of a thin-film transistor layer in accordance with an embodiment.

A cross-sectional side view of a portion of thin-film transistor layer 58 taken through transistor 94 in one of display pixels 90 is shown in FIG. 7. As shown in FIG. 7, thin-film transistor layer 58 may include thin-film transistor structures 58A on substrate 58B. Substrate 58B may be a transparent sheet of material such as glass or other dielectric. Structures 58A may include thin-film transistor 94. Transistor 94 may have an active layer such as layer 110 (e.g. a layer of amorphous silicon or polysilicon). Dielectric passivation layer 112 may separate gate conductor 98 from active layer 110. Passivation layer 114 may cover the conductive material of source-drain conductors 96 and 100. An opening may be formed in passivation layer 114 to form a contact between terminal 96 and electrode layer 106.

Common electrode (Vcom) layer 104 may be formed on the upper surface of dielectric planarization layer 116. Passivation layer 118 may separate electrode layers 106 from common electrode layer 104. Electrode layer 106 may be formed from a layer of transparent conductive material such as indium tin oxide and may be patterned to form finger-shaped electrodes (not shown in FIG. 7). Common electrode layer 104 may be formed as a blanket film of transparent conductive material such as indium tin oxide that covers array 92. Passivation layers such as layers 112, 114, and 118 and planarization layer 116 may be formed from polymers such as photoresist, silicon oxide, silicon nitride, or other suitable dielectric layers. Gate electrode structures 98 and source and drain electrodes 100 and 96 may be formed from a conductive material such as metal. In scenarios in which electrodes 104 and 106 are formed from a transparent conductive material such as indium tin oxide, backlight 44 may pass through display 14 as shown in FIG. 5 without being blocked by electrodes 104 and 106.

The sheet resistance of indium tin oxide is relatively high compared to the sheet resistance of aluminum, copper, and other metals. To lower the effective resistance of the Vcom electrode, it may be desirable to form a grid of metal on top of thin-film transistor layer 58. The grid of metal may be shorted to the indium tin oxide layer forming the Vcom electrode to reduce the effective resistance of the Vcom electrode. The grid of metal may have openings to accommodate the light passing through pixels 90. The openings may be, for example, rectangular openings that are aligned with respective liquid crystal pixels 52'.

Figure 8:
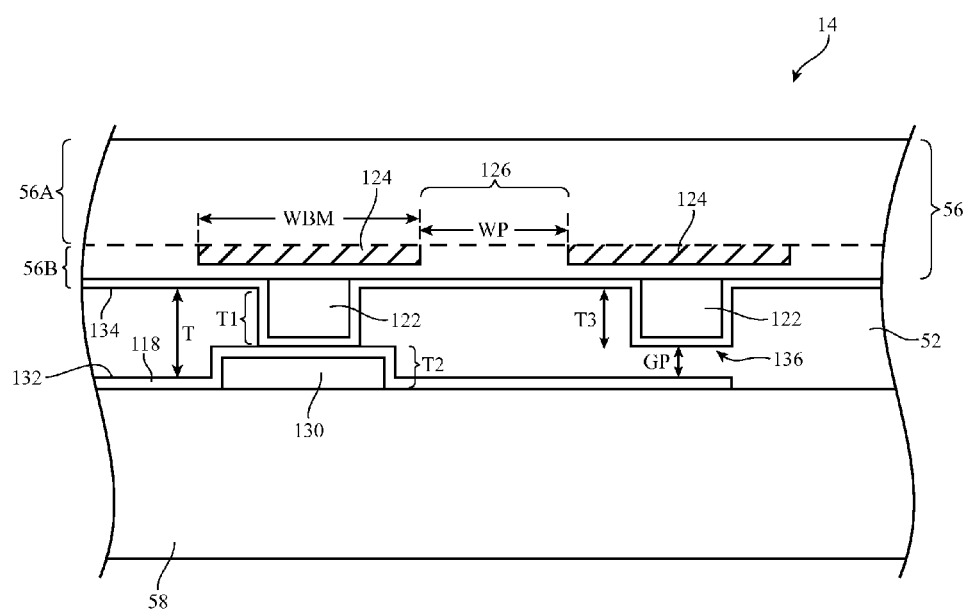
FIG. 8 is a cross-sectional side view of a portion of an illustrative display showing how column spacer structures can be configured in accordance with an embodiment.

To maintain a desired gap for the liquid crystal material between the lower surface of color filter layer 56 and the upper surface of thin-film transistor layer 58, display 14 may be provided with column spacer structures (sometimes referred to as post spacers). A cross-sectional side view of display 14 showing how column spacers 122 may be formed in an array on the lower (inner) surface of color filter layer 56 is shown in FIG. 8. As shown in FIG. 8, color filter layer 56 may include a transparent substrate layer such as clear glass layer 56A. A layer of color filter elements (e.g., an array of red, blue, and green color filter elements formed from colored photoresists) such as layer 56B may be formed on the inner surface of color filter layer 56. A grid of opaque material such as black photoresist forms black matrix 124. Black matrix 124 has a grid pattern with an array of openings such as opening 126. Each opening 126 allows light 44 to pass for a different respective one of pixels 90.

The presence of black matrix 124 may help delineate the boundaries between pixels (e.g., red, blue, and green pixels 90), so that light does not leak between adjacent pixels. The size of openings such as opening 126 in black matrix 124 (sometimes referred as the pixel "aperture") is preferably as large as possible to enhance display brightness efficiency. If aperture 126 is too small, light 44 will be blocked from escaping display 14 and the images that are presented on display 14 will be undesirably dimmed.

Column spacers 122 in display 14 may be formed from a material such as a hardened photoimageable polymer. When handing display layer such as layers 56 and 58 during assembly of display 14, there is a potential for layers 56 and 58 to slip with respect to each other. If care is not taken, column spacers may scratch sensitive material layers in a display such as a thin-film transistor polyimide passivation layer (e.g. layer 118 in the example of FIG. 10).

To ensure that aperture 126 is not too small, it is desirable to minimize lateral dimensions WBM of black mask 124 and to maximize lateral dimensions WP of aperture 126. In some conventional displays, wide black mask structures are formed over column spacers to prevent passivation layer scratches that are produced by the column spacers during assembly from becoming visible to a user. In these conventional displays, aperture size may be undesirably small.

To help minimize scratches and other display damage while maximizing pixel apertures, column spacer pad structures such as column spacer pads 130 can be formed on thin-film-transistor layer 58. Column spacer pads 130 may be formed from the same material that is being used elsewhere on the surface of thin-film-transistor layer 58 to form a resistance-lowering Vcom conductive grid (i.e., pads 130 may be patterned on the surface of layer 58 using the same layer of metal that is being used to form common electrode metal grid lines on Vcom layer 104).

Column spacers 122 may be distributed across the display 14 to maintain a desired gap between layers 56 and 58. Columns spacers 122 may include more than one type of structure. For example, some column spacer structures, such as the left-hand column spacer structure of FIG. 8, may extend all the way from thin-film transistor surface 132 to color filter layer surface 134. By using column spacer thickness T1 and column spacer support pad thickness T2, column spacer structures such as the left-hand column spacer structure of FIG. 8 may establish a desired thickness T=T1+T2 for liquid crystal layer 52. Columns spacers such as the left-hand column spacer of FIG. 8 that establish the separation T between thin-film transistor layer 58 and color filter layer 56 may sometimes be referred to as being the main columns spacers or main columns spacer structures for display 14.

Other column spacer structures, which may sometimes be referred to as subspacer column spacer structures or subspacers may extend only partway between surfaces 134 and 132. In the example of FIG. 8, the right-hand column spacer 122 is a subspacer. A gap GP separates upper surface 132 of thin-film transistor layer 58 from lower surface 136 of subspacer column spacer 122. Because subspacer surfaces such as surface 136 of FIG. 8 are separated from passivation layer 118 on the upper surface of thin-film transistor layer 58 by gap GP, the subspacers will tend not to scratch passivation layer 118, even if there is lateral movement between layers 56 and 58 during assembly.

During use of device 10, display 14 may be subjected to external pressure. For example, a user of device 10 may press against the surface of display 14 with a finger or other external object. Under pressure from the external object, color filter layer 56 may bow downwards towards surface 132 of thin-film transistor layer 58. Due to the presence of subspacers 122 (e.g., a column spacer of the type shown in the right-hand side of FIG. 8), color filter layer 56 and thin-film transistor layer 58 will be maintained a desired distance apart from each other. The presence of column spacer pads 130 may also help separate the subspacers from thin-film transistor layer 58 in configurations of the type shown in FIG. 8.

Subspacers may be formed in display 14 in any suitable ratio to the main column spacers. For example, there may be one, two or more, ten or more, 100 or more, 1000 or more, or 10,000 or more subspacers for each main column spacer in display 14. Displays that only contain main column spacers and that are free of subspacers may also be used.

The main column spacers and the subspacers are blocked from view by a user of device 10 using overlapping regions of black matrix 124 in color filter element layer 56B. Somewhat smaller regions of black matrix 124 may be used when covering subspacers than when covering main column spacers, because subspacers are not as prone to producing scratches as the main columns spacers when color filter layer 56 and thin-film transistor layer 58 slip with respect to each other during assembly. Nonetheless, it is generally desirable to maintain the size of the apertures associated with the subspacers relatively close in magnitude to the apertures associated with the main column spacers. The ability to increase the apertures such as aperture 126 of FIG. 8 that are adjacent to the main column spacers may therefore have a substantial influence on the ability to increase aperture size for all pixels in display 14.

Column spacer support pads 130 may be circular, oval, semicircular, rectangular, square, may have curved edges, may have straight edges, or may have a combination of curved and straight edges.

The size of aperture 126 can be maximized by minimizing the size of column spacer support pads 130. With one suitable arrangement, columns spacer support pad size may be minimized by supporting different columns spacers 122 at different locations on different column spacer support pads 130. This creates redundancy in the column support structures that allows some of the column spacers to slip off of their respective support pads without compromising the overall support functions of the column spacers.

Figure 9:
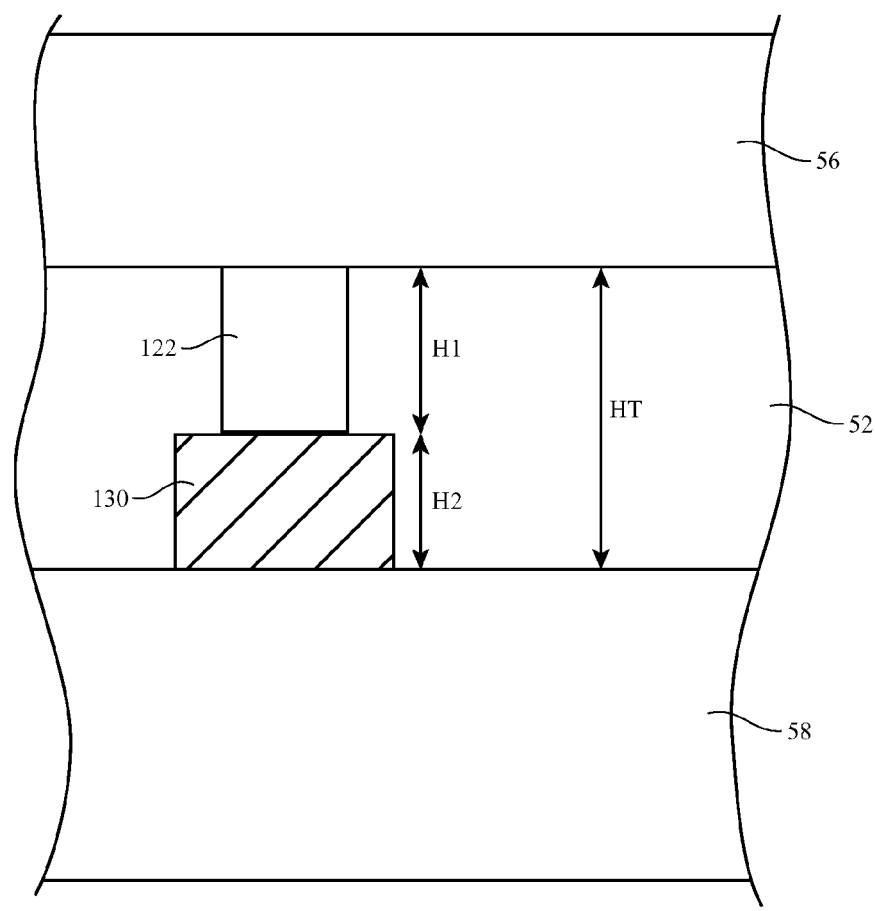
FIG. 9 is a cross-sectional side view of a portion of a display having column spacers and column spacer support pads in accordance with an embodiment.
Figure 10:
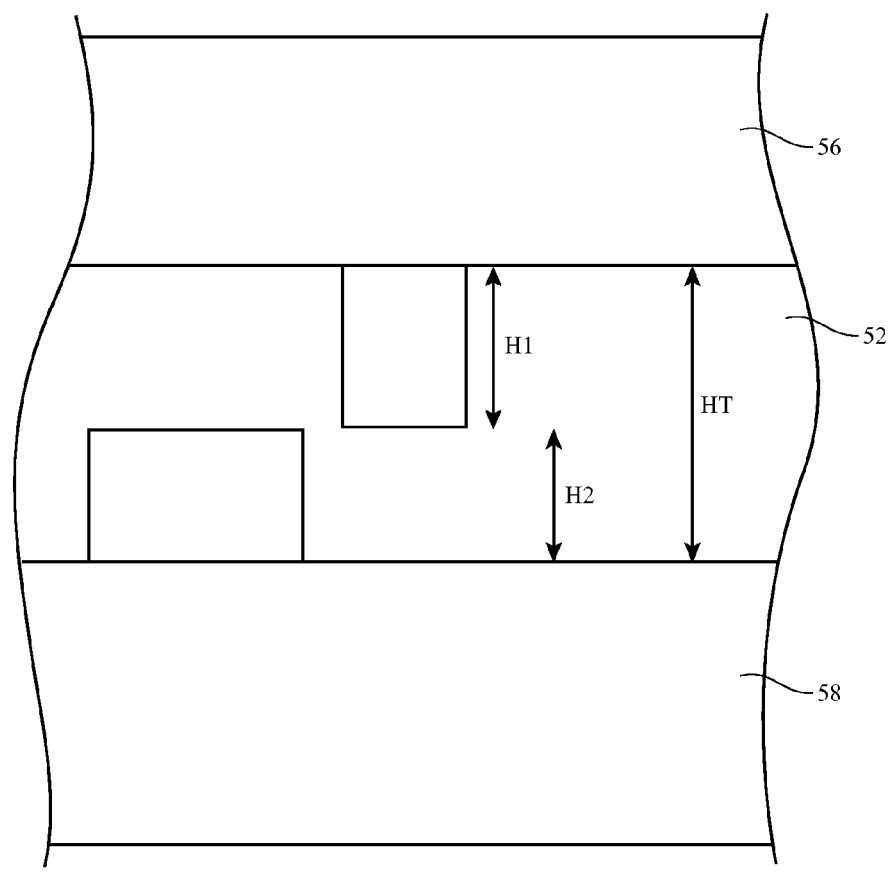
FIG. 10 is a cross-sectional side view of a portion of a display having a column spacer and a column spacer support pad that have shifted relative to each other in accordance with an embodiment.

If desired, display 14 may have column spacers and support pads that have comparable thicknesses. This type of arrangement is shown in FIG. 9. As shown in FIG. 9, column spacer 122 may have a thickness H1 and column spacer support pad 130 may have thickness H2. The total thickness of column spacer 122 and support pad 130 (i.e., the thickness of liquid crystal layer 52) is thickness HT (i.e., HT=H1+H2). The value of thickness HT may be 2.5 to 4 microns, 2 to 5 microns, 1.8 to 7 microns, more than 2.5 microns, less than 2.5 microns, more than 4 microns, or less than 4 microns (as examples). The value of H2 may be 0.5 to 1.2 microns, 0.5 to 2 microns, or other suitable values. The value of H1 may be equal to the value of HT minus the value of H2. The ratio of H1/H2 may be in the range of 85/15 to 15/85, may be in the range of 70/30 to 30/70, may be in the range of 60/40 to 40/60, may be 50/50, or may have other suitable values. As shown in FIG. 10, when the values of H1 and H2 are relatively closed to each other (i.e., when H1 and H2 are equal and/or have values that are within 10% of each other, within 20% of each other, within 30% of each other, or within 40% or other value of each other), misalignment of column spacer 122 and support pad 130 may result in a configuration in which column spacer 122 hangs in liquid crystal layer 52 without contacting the surface of layer 58. (Other columns spacers may be supported by their support pads, if desired) This avoids damage to the surface of layer 58 that might create visible artifacts.

Figure 11:
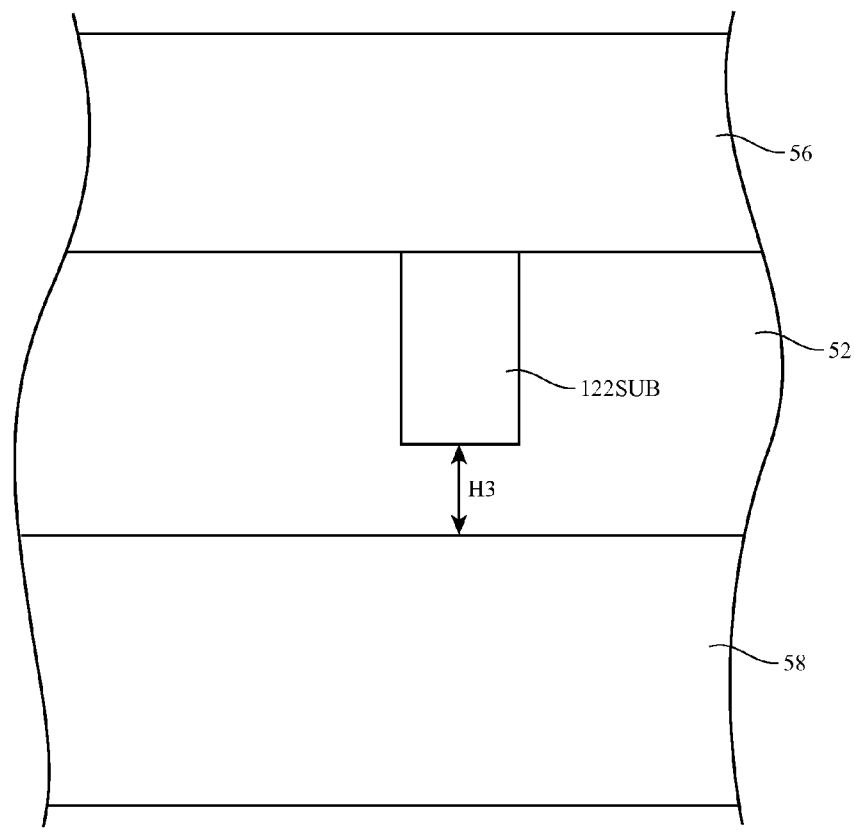
FIG. 11 is a cross-sectional side view of a portion of a display having a subspacer in accordance with an embodiment.

FIG. 11 is a cross-sectional side view of an illustrative subspacer design that may be used in a display conjunction with the column spacer structures of FIG. 9 or other column spacers. As shown in FIG. 11, subspacer 122SUB may be separated from the surface of layer 58 by a gap H3. The value of H3 may be 0.2 to 0.8 microns, 0.3 to 0.7 microns, or other suitable value.

Figure 12:
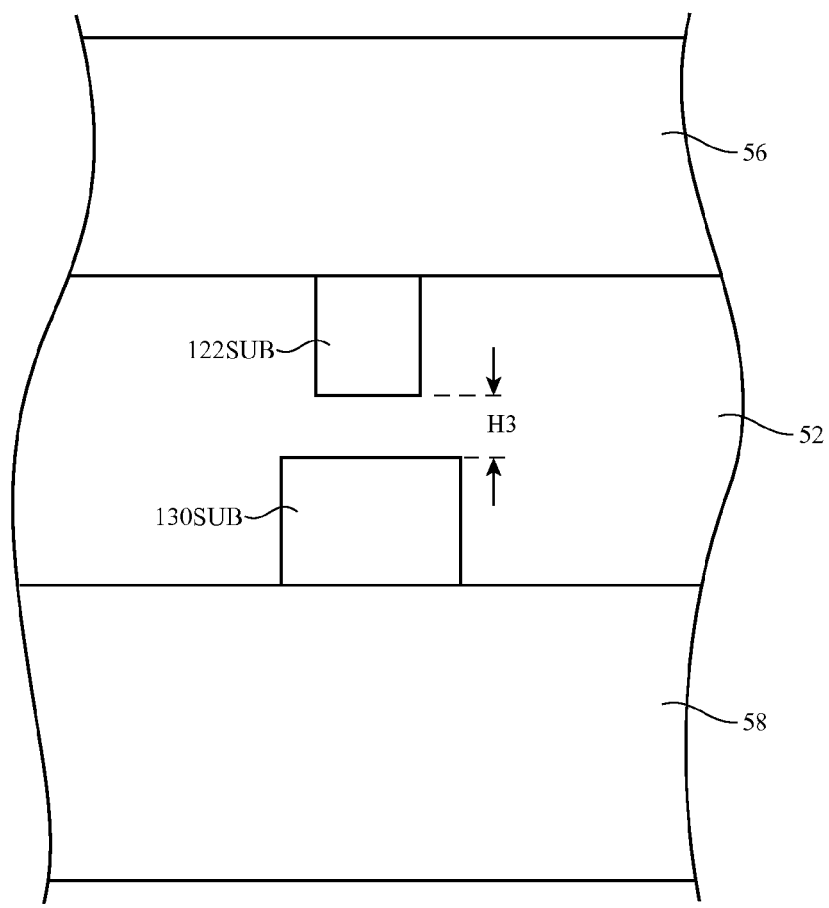
FIG. 12 is a cross-sectional side view of a portion of a display having a subspacer structure with a subspacer support pad in accordance with an embodiment.

In the illustrative configuration of FIG. 12, subspacer structures have been formed that include both a downwardly extending subspacer (subspacer 122SUB) and an upwardly extending subspacer support pad 130SUB. Subspacers of the type shown in FIG. 12 may be used with displays having column spacers of the type shown in FIG. 9 and other displays.

Figure 13:
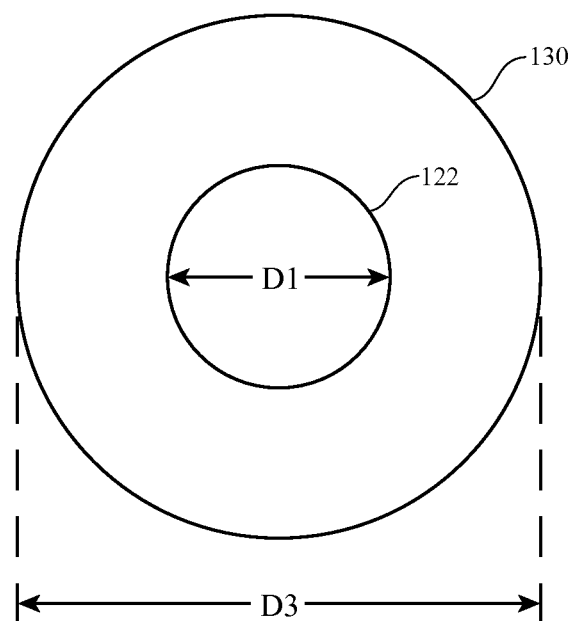
FIG. 13 is a top view of an illustrative column spacer and support pad in accordance with an embodiment.

Column spacers, support pads, and subspacers may be circular (e.g., the footprint of these structures may have the shape of a circle), as shown in FIG. 13. In the example of FIG. 13, column spacer 122 has been formed on top of support pad 130. Spacer 122 may have a diameter D1 of about 5-9 microns, 3-12 microns, or 2-15 microns (as examples). Diameter D3 of support pad 130 may be 8 microns more than D1, may be 2-10 microns more than D1, may be 0.5 to 10 microns more than D1, may be at least 5 microns more than D1, may be equal to D1, may be less than 10 microns more than D1, may be more than 6 microns more than D1, or may be any other suitable value.

Figure 14:
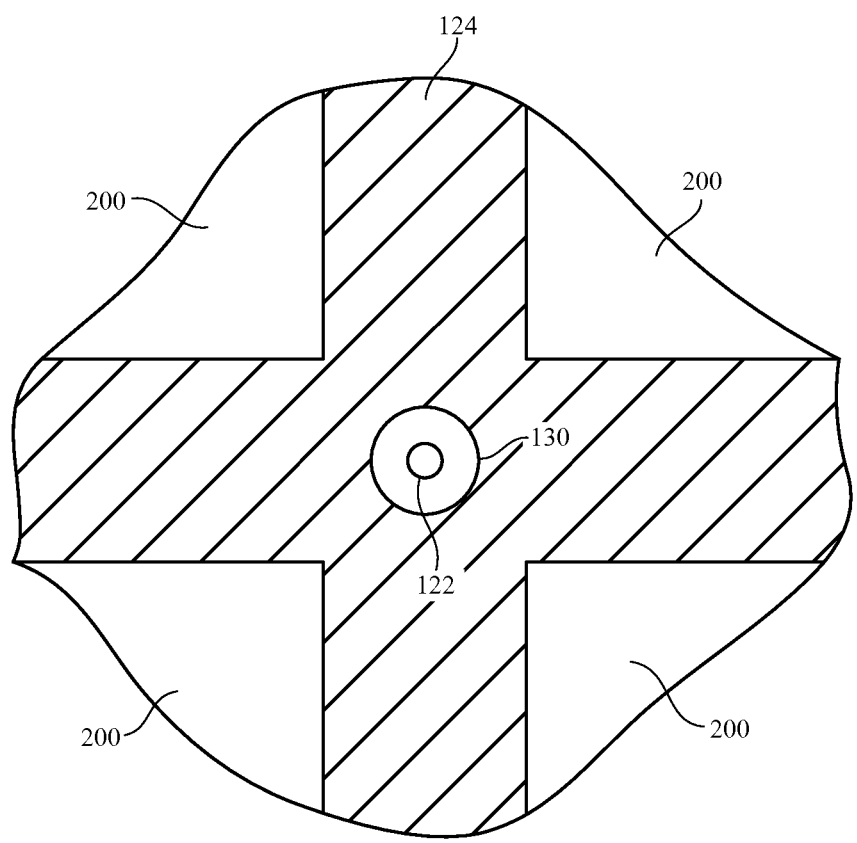
FIG. 14 is a top view of a portion of a display showing where column spacer structures may be located relative to pixel structures in accordance with an embodiment.

FIG. 14 is a top view of a portion of display 14 showing how column spacer structures such as the structures of FIG. 13 may overlap black matrix 124. Black matrix 124 may have the shape of a grid with horizontal and vertical lines. The lines of black matrix 124 may separate individual color filter elements 200 for respective display pixels 90 (e.g., red color filter elements, green color filter elements, and blue color filter elements may overlap openings in the black matrix). Black matrix 124 and color filter elements 200 in a color filter array may, if desired, be formed on thin-film transistor layer (e.g., in a configuration in which the color filter for display 14 is formed as an integral portion of the thin-film transistor layer rather than being formed as a separate layer above liquid crystal layer 52).

Figure 15:
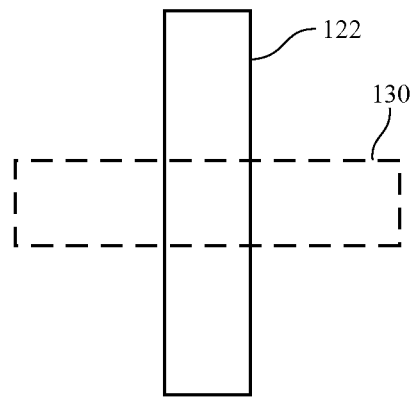
FIG. 15 is a top view of a column spacer with a laterally elongated shape and a column support pad with a laterally elongated shape that crosses the column spacer at a right angle in accordance with an embodiment.
Figure 16:
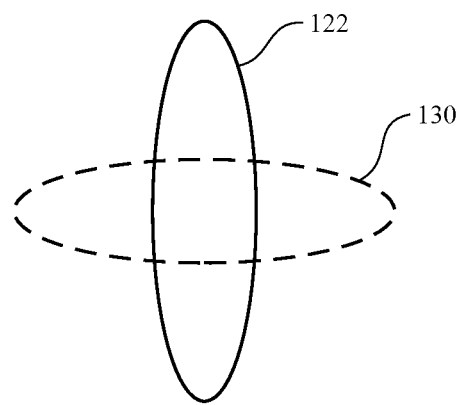
FIG. 16 is a top view of an oval laterally elongated column spacer and an oval laterally elongated support pad that cross the column spacer at a right angle in accordance with an embodiment.

If desired, column spacer 122 and support pad 130 (or a subspacer and subspacer support pad) may be laterally elongated and may be oriented at right angles to each other as illustrated in the top view of FIG. 15. In subspacer configurations, spacer 122 may be a subspacer and pad 130 may be a subspacer support pad that is vertically separated from spacer 122 by a gap such as gap H3. In the FIG. 15 example, structures 122 and 130 have rectangular laterally elongated shapes that extend perpendicular to each other. FIG. 16 shows how column spacer 122 and support pad 130 (or a subspacer and corresponding subspacer support pad) may have oval footprints that extend perpendicular to each other. Other shapes may be used if desired. Illustrative operations involved in forming column spacer structures (e.g., column spacer 122 and pad 130 of FIG. 9 or other column spacer structures) are shown in FIGS. 17, 18, 19, 20, 21, and 22.

Figure 17:
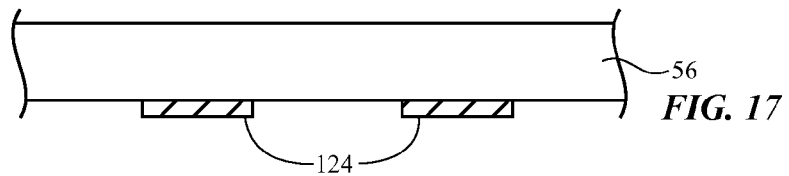
FIG. 17 is a cross-sectional side view of a display substrate that has been provided with a black matrix in accordance with an embodiment.
Figure 18:
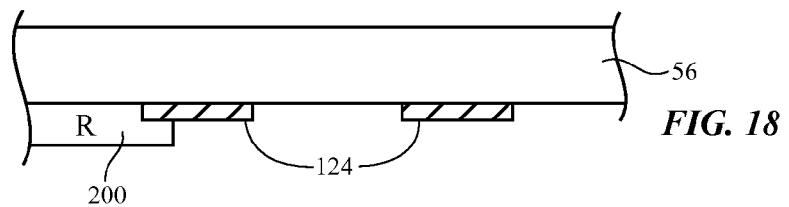
FIG. 18 is a cross-sectional side view of the display substrate of FIG. 17 following patterning of a red layer of color filter material to form a red color filer element in accordance with an embodiment.

Initially, black matrix 124 may be formed on layer 56 (FIG. 17). Black matrix 124 may have a grid shape with openings for color filter elements of different colors or may have other suitable shapes.

Following formation of layer 56, a first layer of color filter elements may be formed. For example, a color filter element 200 of a particular color may be formed, as illustrated by color filter element 200 for a red pixel R in FIG. 18.

Figure 19:
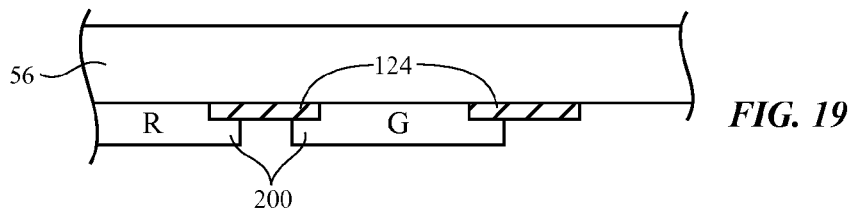
FIG. 19 is a cross-sectional side view of the display substrate of FIG. 18 following patterning of a green layer of color filter material to form a green color filter element in accordance with an embodiment.
Figure 20:
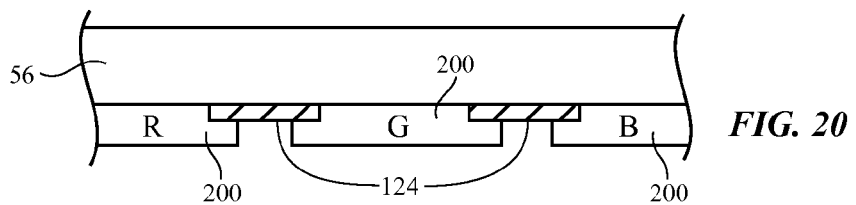
FIG. 20 is a cross-sectional side view of the display substrate of FIG. 19 following deposition of a patterned blue layer of color filter material to form a blue color filter element in accordance with an embodiment.

As shown in FIG. 19, a color filter element G for a green pixel may be formed after the color filter element for the red pixel has been formed.

Following formation of the red and green color filter elements 200 (or after forming color filter elements from color filter material of different colors), an additional color filter element such as blue color filter element 200 (i.e., element B) may be formed on layer 56. Layer 56 may be a color filter layer. (If desired, black matrix and color filter element structures may also be formed on a thin-film transistor layer.)

Color filter elements 200 may be formed using a photoimageable polymer (e.g. a polymer dyed red, green, and blue for red, green, and blue color filter elements, respectively) or other suitable color filter element material. The color filter element materials used in forming elements 200 may be patterned using photolithography or other suitable techniques (e.g., shadow mask deposition, ink jet printing, etc.). These techniques may also be used in depositing other structures in display 14 (e.g., column spacer structures, support pads, black matrix, etc.).

Figure 21:
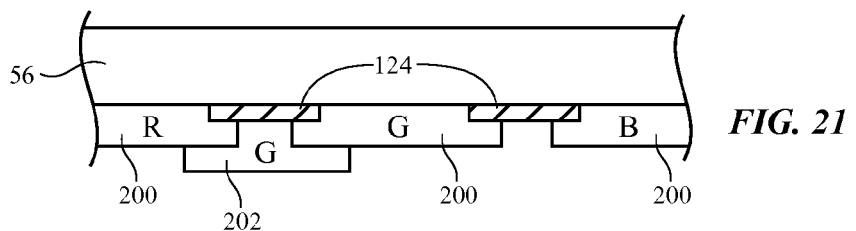
FIG. 21 is a cross-sectional side view of the display substrate of FIG. 20 following deposition and patterning of a layer of color filter material to form a column spacer structure in accordance with an embodiment.
Figure 22:
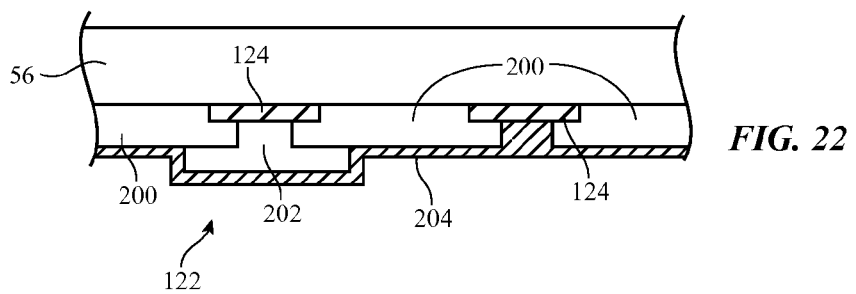
FIG. 22 is a cross-sectional side view of the display substrate of FIG. 21 following deposition of an overcoat layer in accordance with an embodiment.

After forming color filter elements 200, an additional polymer element may be formed on layer 56. As shown in FIG. 21, for example, an additional polymer structure (e.g., an additional structure formed from color filter element material) such as structure 202 may be formed on black matrix 124. Structure 202 may be green, red, blue, clear, or other suitable color and may be formed from a color filter element material such as dyed photoimageable polymer material using photolithography or other suitable fabrication techniques. A polymer overcoat (e.g., an organic layer) may then be formed on layer 56 such as polymer overcoat 204 of FIG. 22. As shown in FIG. 22, the formation of structure 202 on layer 56 creates a raised protrusion on the surface of layer 56 that serves as column spacer 122.

Figure 23:
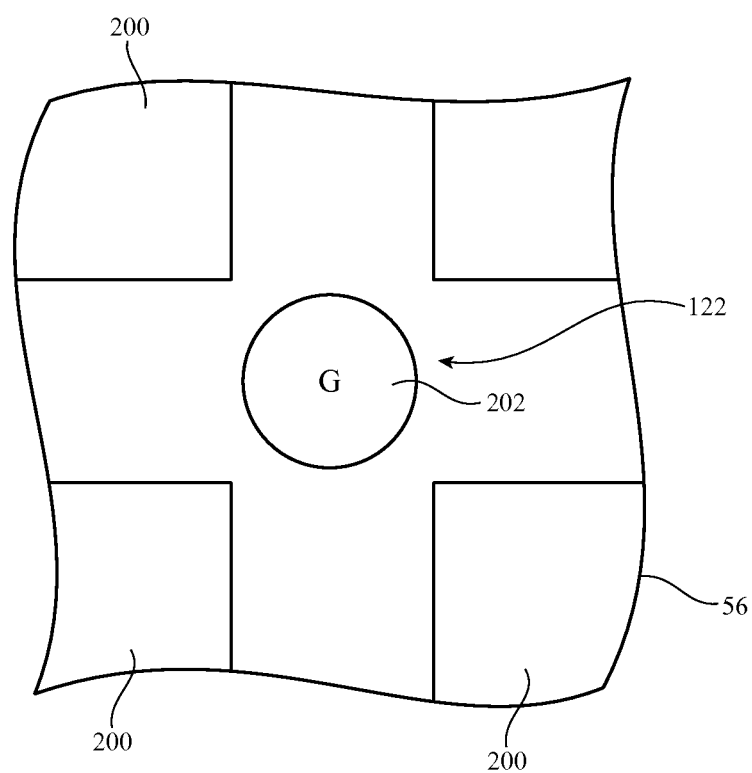
FIG. 23 is a top view of a portion of a display showing how column spacer structures may be located over a black matrix that has openings for color filter elements in accordance with an embodiment.

FIG. 23 is a top view of the structures of FIG. 22 showing how column spacer 122 may be formed over black matrix 124 between respective color filter elements 200 for color filter layer 56.

Figure 24:
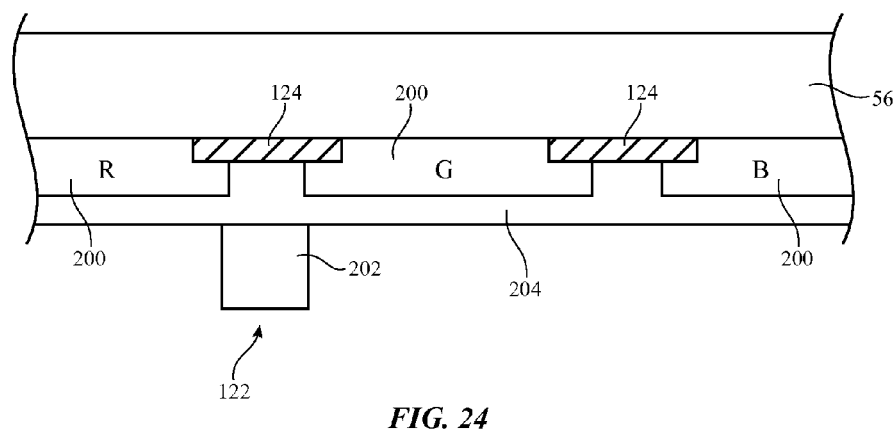
FIG. 24 is a cross-sectional side view of a portion of a display substrate in which a column spacer has been formed over an overcoat layer and over a black matrix on the underside of a color filter layer in accordance with an embodiment.

If desired, overcoat layer 204 may be formed under polymer structure 202 rather than over polymer structure 202, as shown in FIG. 24. Column spacer 122 (or a subspacer) may overlap black matrix 124, so that overcoat 204 is interposed between layer 56 and structure 202.

Figure 25:
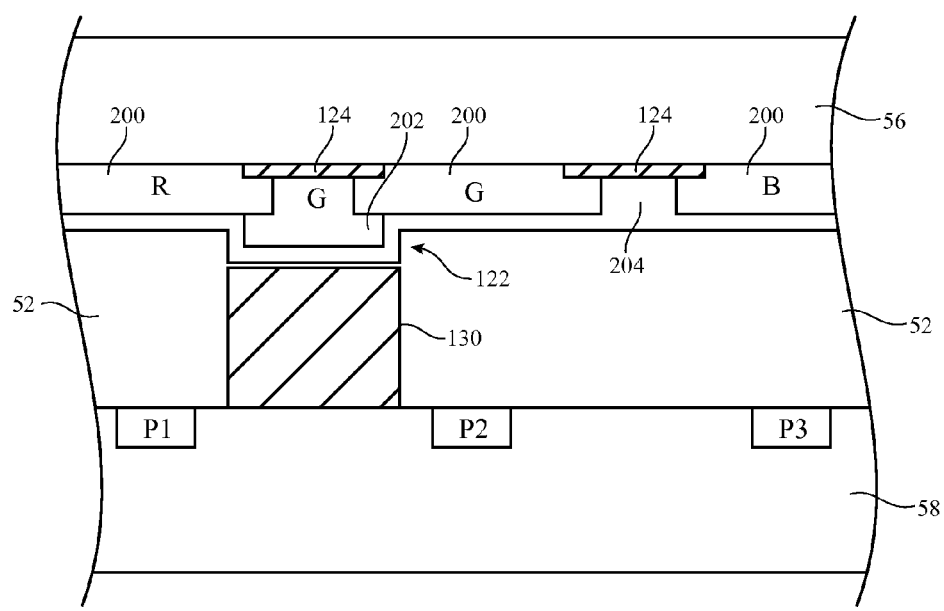
FIG. 25 is a cross-sectional side view of a portion of a display with a column spacer and a corresponding spacer support pad in accordance with an embodiment.

FIG. 25 is a cross-sectional side view of a portion of display 14 in a configuration in which column spacer 122 has been formed by depositing an additional polymer structure (e.g., additional structure 202). Structure 202 may be formed from color filter element material (e.g., green color filter element material in the example of FIG. 25). Column spacer structures, subspacers, and support pads may also be formed from different material (e.g., a photoimagable acrylic polymer adhesive or other material that is not used in forming color filter elements 200). Structure 202 is formed on top of black matrix 124 and is covered with overcoat layer 204. As shown in FIG. 25, support pad 130 may be located between pixels. In particular, thin-film transistor layer 58 may contain electrodes and other circuitry associated with pixels such as pixels P1, P2, and P3. Pixels P1, P2, and P3 are aligned with corresponding color filter elements 200 in color filter layer 200. As shown in FIG. 25, support pad 130 may be located between pixels (i.e., between the electrodes and other circuitry on thin-film transistor layer 58 that is associated with pixels P1 and P2 in the example of FIG. 25). In general, the surface areas of the column spacers is less than or equal to that of the support pads (see, e.g., FIG. 13). In the example of FIG. 25, column spacers such as column spacer 122 have been formed on color filter layer 56 and support pads such as support pad 130 have been formed on thin-film transistor layer 58. If desired, a mixture of column spacers and support pads may be formed on color filter layer 56 and a corresponding mixture of respective support pads and column spacers may be formed on thin-filmed transistor layer 58. Configurations in which column spacers 122 are formed on thin-film transistor layer 58 (e.g., in the position shown by pad 130 of FIG. 25) and in which associated support pads 130 are formed on color filter layer 56 (e.g., in the position shown by spacer 122 of FIG. 25) may also be used in forming display 14.

Figure 26:
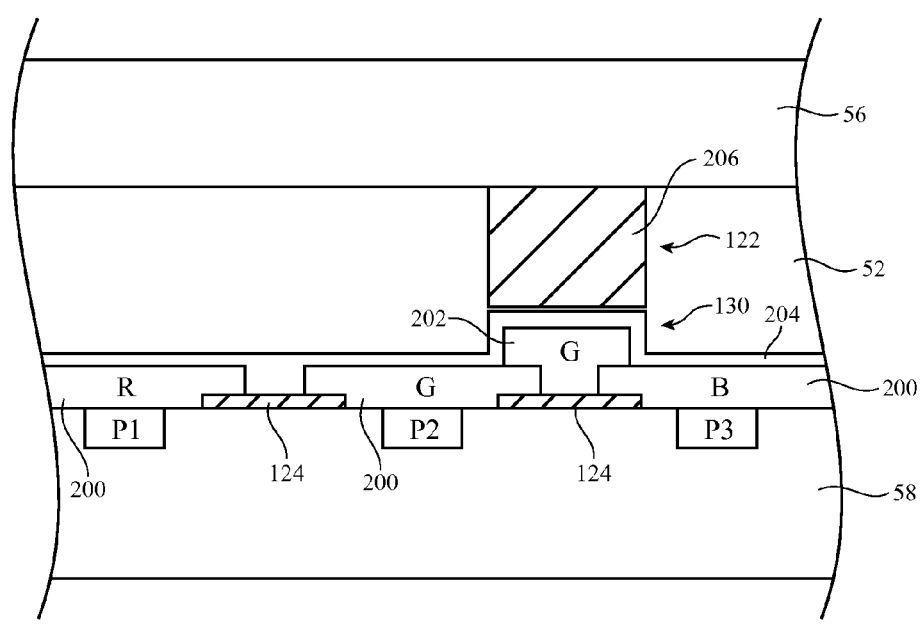
FIG. 26 is a cross-sectional side view of a portion of a display having spacer structures formed from a column spacer on the underside of a clear substrate layer and a corresponding support pad formed from color filter element material on a thin-film transistor layer over a black matrix in accordance with an embodiment.

In the illustrative configuration of FIG. 26, column spacer 122 has been formed from polymer structure 206 (e.g., a patterned photoimageable acrylic structure or other organic polymer) on layer 56 and support structure 130 has been formed from additional polymer structure 202 on layer 58. Additional polymer structure 202 is formed on black matrix 124 (i.e., black matrix 124 is interposed between structure 202 and layer 58) and is covered with overcoat 204. Layer 56 may be a clear substrate (e.g., a clear layer of glass or plastic) and need not contain color filter elements. Rather, color filter elements 200 of different colors (e.g., red, green, and blue) may be formed in an array on thin-film transistor layer 58 in alignment with respective pixels P1, P2, P3, etc. Black matrix 124 may have openings aligned with the color filter elements 200 and pixels. Column spacer 122 and support pad 130 (and, if desired, a subspacer and/or sub-spacer support pad formed using this arrangement) may overlaps black matrix. The foregoing is merely illustrative of the principles of this invention and various modifications can be made by those skilled in the art without departing from the scope and spirit of the invention.

What is claimed is:

1. A display, comprising:
    a color filter layer having an inner surface and an opposing outer surface, wherein the color filter layer includes a column spacer on the inner surface;
    a thin-film transistor layer having a column spacer support pad for supporting the column spacer, wherein the column spacer support pad and the column spacer have heights that are within 30% of each other;
    a layer of liquid crystal material between the color filter layer and the thin-film transistor layer;
    a black matrix on the inner surface, wherein the column spacer is formed at least partly from color filter element material that overlaps the black matrix; and
    an organic polymer overcoat layer on the color filter layer, wherein the organic polymer overcoat layer has first and second opposing sides, wherein the column spacer is formed on the first side of the organic polymer overcoat layer and wherein the black matrix is formed on the second side of the organic polymer overcoat layer.

2. The display defined in claim 1 wherein the column spacer support pad is circular.

3. The display defined in claim 2 wherein the column spacer is circular.

4. The display defined in claim 3 wherein the column spacer support pad has a first diameter, wherein the column spacer has a second diameter, and wherein the second diameter is different than the first diameter.

5. The display defined in claim 4 wherein the first diameter is greater than the second diameter.

6. The display defined in claim 5 wherein the first diameter is more than 5 microns more than the second diameter.

7. The display defined in claim 1 wherein the color filter layer comprises an array of color filter elements formed from color filter material.

8. The display defined in claim 1 further comprising a subspacer column spacer on the inner surface of the color filter layer.

9. The display defined in claim 8, wherein the subspacer column spacer is separated from the thin-film transistor layer by a gap.

10. The display defined in claim 1 further comprising:
    a subspacer column spacer on the inner surface of the color filter layer; and
    a subspacer column spacer support pad under the subspacer column spacer.

11. The display defined in claim 10 wherein the subspacer column spacer and the subspacer column spacer support pad are separated by a gap of 0.2 to 0.8 microns.

12. The display defined in claim 11 wherein the subspacer column spacer has a laterally elongated shape and wherein the subspacer column spacer support pad has a laterally elongated shape that extends perpendicular to the laterally elongated shape of the subspacer column spacer.

13. The display defined in claim 1 wherein the column spacer support pad and the column spacer have heights that differ by less than 10%.

14. The display defined in claim 1, wherein the column spacer is in direct contact with the first side of the organic polymer overcoat layer and the black matrix is in direct contact with the second side of the organic polymer overcoat layer.

15. A display, comprising:
    a substrate layer having an inner surface and an opposing outer surface, wherein the substrate layer includes a column spacer on the inner surface;
    a thin-film transistor layer having a column spacer support pad for supporting the column spacer;
    an array of pixels formed on the thin-film transistor layer;
    a black matrix on the thin-film transistor layer that separates the pixels, wherein the column spacer support pad is formed on the thin-film transistor layer on top of the black matrix;
    a layer of liquid crystal material between the substrate layer and the thin-film transistor layer; and
    an array of color filter elements formed from color filter material on the thin-film transistor layer each of which overlaps a respective one of the pixels, wherein the column spacer support pad is formed at least partly from color filter element material.

16. A display, comprising:
    a color filter layer having an inner surface and an opposing outer surface, wherein the color filter layer has an array of color filter elements of different colors formed from color filter element material on the inner surface and wherein the array of color filter elements includes a first color filter element and a second color filter element;
    a thin-film transistor layer;
    a layer of liquid crystal material between the color filter layer and the thin-film transistor layer;
    a plurality of column spacers on the inner surface of the color filter layer that are formed from the color filter element material, wherein the plurality of column spacers includes a first column spacer;
    a plurality of column spacer support pads on the thin-film transistor layer, wherein each column spacer support pad supports a respective one of the column spacers; and
    a black matrix on the color filter layer that defines openings for the color filter elements, wherein the column spacers overlap the black matrix, wherein a portion of the black matrix is interposed between the first and second color filter elements, wherein the first column spacer overlaps the portion of the black matrix, and wherein the first column spacer directly contacts the portion of the black matrix, the first color filter element, and the second color filter element.

17. The display defined in claim 16 wherein the column spacer support pads and the column spacers have respective heights that differ by less than 20%.

18. The display defined in claim 16, wherein the column spacer directly contacts two surfaces of the first color filter element and two surfaces of the second color filter element.

19. The display defined in claim 18, wherein the first color filter element is a first color, wherein the second color filter element is a second color that is different than the first color, wherein the first column spacer comprises color filter element material that is a third color, and wherein the first color and the third color are the same.

* * * * *